United States Patent [19]
Cattanach

[11] 3,760,024
[45] Sept. 18, 1973

[54] PREPARATION OF AROMATICS

[75] Inventor: John Cattanach, Camberley, England

[73] Assignee: Mobil Oil Corporation, New York, N.Y.

[22] Filed: June 16, 1971

[21] Appl. No.: 153,855

[52] U.S. Cl. ............................................. 260/673
[51] Int. Cl. ............................................. C07c 5/27
[58] Field of Search ...................... 260/673; 208/120

[56] References Cited
UNITED STATES PATENTS

| | | | |
|---|---|---|---|
| 2,971,904 | 2/1961 | Gladrow et al. | 208/135 |
| 2,971,903 | 2/1961 | Kimberlin, Jr. et al. | 208/119 |
| 3,140,251 | 7/1964 | Plank et al. | 208/120 |
| 3,140,249 | 7/1964 | Plank et al. | 208/120 |
| 3,140,253 | 7/1964 | Plank et al. | 208/120 |
| 3,140,322 | 7/1964 | Frilette et al. | 260/667 |
| 3,374,281 | 3/1968 | Cricsery et al. | 260/673 |
| 3,296,324 | 1/1967 | Cricsery et al. | 260/673 |
| 3,702,886 | 11/1972 | Argauer et al. | 423/328 |

Primary Examiner—Delbert E. Gantz
Assistant Examiner—Juanita M. Nelson
Attorney—Oswald G. Hayes et al.

[57] ABSTRACT

A process for the preparation of aromatic compounds is set forth which involves contacting a feed consisting essentially of $C_2$-$C_4$ paraffins and/or olefins with a crystalline aluminosilicate of the ZSM-5 type and recovering the aromatics produced. The described process can be carried out in the absence of a hydrogenation/dehydrogenation component and in the absence of added hydrogen.

4 Claims, No Drawings

PREPARATION OF AROMATICS

BACKGROUND OF THE INVENTION

It has long been known to contact various hydrocarbon fractions with acidic catalysts generally and, in particular, with solid siliceous acidic catalysts — including those referred to as crystalline aluminosilicate zeolites. Contact of said hydrocarbon feed with said acid catalysts was carried out for a wide variety of reactions including cracking, isomerization, hydrocracking, etc. Representative United States Patents disclosing and claiming contacting of various hydrocarbon fractions with crystalline aluminosilicates are U. S. Pat. Nos. 3,140,249; 3,140,251; 3,140,253; and 3,140,322.

The contact of paraffinic feedstocks with crystalline aluminosilicate zeolites is also known in the art and by far the primary reason for contacting paraffinic materials with zeolites has been for the purpose of cracking them, i.e., converting them to lower molecular weight products. Typical applications in this general field would be the use of crystalline aluminosilicate zeolites for carrying out dewaxing reactions, i.e., the cracking of paraffins to low molecular weight materials. U. S. Pat. No. 3,400,072 discloses a dewaxing process with crystalline aluminosilicates generally and copending application Ser. No. 865,470, filed Oct. 10, 1969, discloses and claims dewaxing operations carried out with a novel type of crystalline aluminosilicates identified as those of the ZSM-5 type.

The instant application is not concerned with hydrocarbon conversion in general, but rather, is concerned with the conversion of hydrocarbons consisting essentially of $C_2$–$C_4$ paraffins, olefins, and mixtures thereof. Additionally, the instant application is not concerned with any hydrocarbon conversion such as the cracking of these materials to still lower molecular weight products, but rather, is concerned with the preparation of aromatic compounds from $C_2$ – $C_4$ olefins, paraffins, and mixtures thereof.

The formation of aromatic compounds from low molecular weight paraffins is also known in the art, but said prior art processes always required the presence of a strong hydrogenation/dehydrogenation component. Processes of this type are disclosed in U. S. Pat. Nos. 3,296,324 and 3,374,281.

DESCRIPTION OF THE INVENTION

The instant invention is concerned with contacting a feed stream consisting essentially of $C_2$–$C_4$ paraffins, olefins and mixtures thereof over a crystalline aluminosilicate identified as those of the ZSM-5 type in order to obtain aromatic hydrocarbon. For reasons which are not completely understood, it has been discovered that apparently a novel reaction mechanism is involved since for the first time it is not necessary to employ a hydrogenation/dehydrogenation component in association with the crystalline aluminosilicate zeolite of the ZSM-5 type.

Additionally, the novel process of this invention has a very practical economic potential since the ZSM-5 type catalysts employed are surprisingly stable under the reaction conditions employed so that they remain active over long periods of time thereby eliminating the need for frequent regeneration. As can well be appreciated, a common characteristic of all prior acidic catalysts whether amorphous or crystalline was that they aged rapidly in the absence of a hydrogenation/dehydrogenation component. The instant invention provides a process for the direct conversion of $C_2$–$C_4$ paraffins or olefins to aromatics which can be operated for long periods of time without adverse effects on catalyst activity or product selectivity.

As has heretofore been stated, the novel process of this invention utilizes crystalline aluminosilicates of the ZSM-5 type.

ZSM-5 type zeolites include not only ZSM-5 but also ZSM-8 zeolites. ZSM-5 materials are disclosed and claimed in copending application Ser. No. 865,472, filed Oct. 10, 1969, and ZSM-8 is disclosed and claimed in copending application Ser. No. 865,418, filed Oct. 10, 1969.

The family of ZSM-5 compositions has the characteristic x-ray diffraction pattern set forth in Table 1, hereinbelow. ZSM-5 compositions can also be identified, in terms of mole ratios of oxides as follows:

$$0.9 \pm 0.2 \, M_2/nO : W_2O_3 : 5\text{-}100 \, YO_2 : z \, H_2O$$

wherein M is a cation, n is the valence of said cation, W is selected from the group consisting of aluminum and gallium, Y is selected from the group consisting of silicon and germanium, and z is from 0 to 40. In a preferred synthesized form, the zeolite has a formula, in terms of mole ratios of oxides, as follows:

$$0.9 \pm 0.2 \, M_2/nO : Al_2O_3 : 5\text{-}100 \, SiO_2 : z \, H_2O$$

and M is selected from the group consisting of a mixture of alkali metal cations, especially sodium, and tetraalkylammonium cations, the alkyl groups of which preferably contain 2–5 carbon atoms.

In a preferred embodiment of ZSM-5, W is aluminum, Y is silicon and the silica/alumina mole ratio is at least 10 and ranges up to about 60.

Members of the family of ZSM-5 zeolites possess a definite distinguishing crystalline structure whose X-ray diffraction pattern shows the following significant lines:

TABLE 1

| Interplanar Spacing d(A) | Relative Intensity |
|---|---|
| $11.1 \pm 0.2$ | S |
| $10.0 \pm 0.2$ | S |
| $7.4 \pm 0.15$ | W |
| $7.1 \pm 0.15$ | W |
| $6.3 \pm 0.1$ | W |
| $6.04 \pm 0.1$ | W |
| $5.97 \pm 0.1$ | W |
| $5.56 \pm 0.1$ | W |
| $5.01 \pm 0.1$ | W |
| $4.60 \pm 0.08$ | W |
| $4.25 \pm 0.08$ | W |
| $3.85 \pm 0.07$ | VS |
| $3.71 \pm 0.05$ | S |
| $3.64 \pm 0.05$ | M |
| $3.04 \pm 0.03$ | W |
| $2.99 \pm 0.02$ | W |
| $2.94 \pm 0.02$ | W |

These values as well as all other X-ray data were determined by standard techniques. The radiation was the K-alpha doublet of copper, and a scintillation counter spectrometer with a strip chart pen recorder was used. The peak heights, I, and the positions as a function of 2 times theta, where theta is the Bragg angle, were read from the spectrometer chart. From these the relative intensities 100 I/I, where I is the intensity of the strongest line or peak, and d(Obs.), the interplanar spacing in A, corresponding to the recorded lines, were calculated. In Table 1 the relative intensities are given in terms of the symbols S = strong, M = medium, MS = medium strong, MW = medium weak and VS = very strong. It should be understood that this X-ray diffraction pattern is characteristic of all the species of ZSM-5 compositions. Ion exchange of the sodium ion with cations reveals substantially the same pattern with some minor shifts in interplanar spacing and variation in relative intensity. Other minor variations can occur depending on the silicon to aluminum ratio of the particular sample, as well as if it has been subjected to thermal treatment. Various cation exchanged forms of ZSM-5 have been prepared. X-ray powder diffraction patterns of several of these forms are set forth below. The ZSM-5 forms set forth below are all aluminosilicates.

TABLE 2

X-Ray Diffraction ZSM-5 Powder in Cation Exchanged Forms d Spacings Observed

| As Made | HCl | NaCl | CaCl$_2$ | RECl$_3$ | AgNO$_3$ |
|---|---|---|---|---|---|
| 11.15 | 11.16 | 11.19 | 11.19 | 11.19 | 11.19 |
| 10.01 | 10.03 | 10.05 | 10.01 | 10.06 | 10.01 |
| 9.74 | 9.78 | 9.80 | 9.74 | 9.79 | 9.77 |
| — | — | 9.01 | 9.02 | — | 8.99 |
| 8.06 | — | — | — | — | — |
| 7.44 | 7.46 | 7.46 | 7.46 | 7.40 | 4.46 |
| 7.08 | 7.07 | 7.09 | 7.11 | — | 7.09 |
| 6.70 | 6.72 | 6.73 | 6.70 | 6.73 | 6.73 |
| 6.36 | 6.38 | 6.38 | 6.37 | 6.39 | 6.37 |
| 5.99 | 6.00 | 6.01 | 5.99 | 6.02 | 6.01 |
| 5.70 | 5.71 | 5.73 | 5.70 | 5.72 | 5.72 |
| 5.56 | 5.58 | 5.58 | 5.57 | 5.59 | 5.58 |
| 5.37 | — | 5.38 | 5.37 | 5.38 | 5.37 |
| 5.13 | 5.11 | 5.14 | 5.12 | 5.14 | — |
| 4.99 | 5.01 | 5.01 | 5.01 | 5.01 | 5.01 |
| — | — | 4.74 | — | — | — |
| 4.61 | 4.62 | 4.62 | 4.61 | 4.63 | 4.62 |
| — | — | 4.46 | 4.46 | — | 4.46 |
| 4.36 | 4.37 | 4.37 | 4.36 | 4.37 | 4.37 |
| 4.26 | 4.27 | 4.27 | 4.26 | 4.27 | 4.27 |
| 4.08 | — | 4.09 | 4.09 | 4.09 | 4.09 |
| 4.00 | 4.01 | 4.01 | 4.00 | 4.01 | 4.01 |
| 3.84 | 3.85 | 3.85 | 3.85 | 3.86 | 3.86 |
| 3.82 | 3.82 | 3.82 | 3.82 | 3.83 | 3.82 |
| 3.75 | 3.75 | 3.75 | 3.76 | 3.76 | 3.75 |
| 3.72 | 3.72 | 3.72 | 3.72 | 3.72 | 3.72 |
| 3.64 | 3.65 | 3.65 | 3.65 | 3.65 | 3.65 |
| — | 3.60 | 3.60 | 3.60 | 3.61 | 3.60 |
| 3.48 | 3.49 | 3.49 | 3.48 | 3.49 | 3.49 |
| 3.44 | 3.45 | 3.45 | 3.44 | 3.45 | 3.45 |
| 3.34 | 3.35 | 3.36 | 3.35 | 3.35 | 3.35 |
| 3.31 | 3.31 | 3.32 | 3.31 | 3.32 | 3.32 |
| 3.25 | 3.25 | 3.26 | 3.25 | 3.25 | 3.26 |
| 3.17 | — | — | 3.17 | 3.18 | — |
| 3.13 | 3.14 | 3.14 | 3.14 | 3.15 | 3.14 |
| 3.05 | 3.05 | 3.05 | 3.04 | 3.06 | 3.05 |
| 2.98 | 2.98 | 2.99 | 2.98 | 2.99 | 2.99 |
| — | — | — | — | 2.97 | — |
| — | 2.95 | 2.95 | 2.94 | 2.95 | 2.95 |
| 2.86 | 2.87 | 2.87 | 2.87 | 2.87 | 2.87 |
| 2.80 | — | — | — | — | — |
| 2.78 | — | — | 2.78 | — | 2.78 |
| 2.73 | 2.74 | 2.74 | 2.73 | 2.74 | 2.74 |
| 2.67 | — | — | 2.68 | — | — |
| 2.66 | — | — | 2.65 | — | — |
| 2.60 | 2.61 | 2.61 | 2.61 | 2.61 | 2.61 |
| — | 2.59 | — | 2.59 | — | — |
| 2.57 | — | 2.57 | 2.56 | — | 2.57 |
| 2.50 | 2.52 | 2.52 | 2.52 | 2.52 | — |
| 2.49 | 2.49 | 2.49 | 2.49 | 2.49 | 2.49 |
| — | — | — | 2.45 | — | — |
| 2.41 | 2.42 | 2.42 | 2.42 | 2.42 | — |
| 2.39 | 2.40 | 2.40 | 2.39 | 2.40 | 2.40 |
| — | 2.38 | — | — | 2.35 | 2.38 |
| — | 2.33 | — | 2.33 | 2.32 | 2.33 |
| — | 2.30 | — | — | — | — |
| — | 2.24 | 2.23 | 2.23 | — | — |
| — | 2.20 | 2.21 | 2.20 | 2.20 | — |
| — | 2.18 | 2.18 | — | — | — |
| — | — | 2.17 | 2.17 | — | — |
| — | 2.13 | — | 2.13 | — | — |
| — | 2.11 | 2.11 | — | 2.11 | — |
| — | — | — | 2.10 | 2.10 | — |
| — | 2.08 | 2.08 | — | 2.08 | 2.08 |
| — | — | 2.07 | 2.07 | — | — |
| — | — | — | 2.04 | — | — |
| 2.01 | 2.01 | 2.01 | 2.01 | 2.01 | 2.01 |
| 1.99 | 2.00 | 1.99 | 1.99 | 1.99 | 1.99 |
| — | — | — | 1.97 | 1.96 | — |
| 1.95 | 1.95 | 1.95 | 1.95 | 1.95 | — |
| — | — | — | — | 1.94 | — |
| — | 1.92 | 1.92 | 1.92 | 1.92 | 1.92 |
| 1.91 | — | — | — | 1.91 | — |
| — | — | — | — | 1.88 | — |
| 1.87 | 1.87 | 1.87 | 1.87 | 1.87 | 1.87 |
| — | 1.86 | — | — | — | — |
| 1.84 | 1.84 | — | — | 1.84 | 1.84 |
| 1.83 | 1.83 | 1.83 | 1.83 | 1.83 | — |
| 1.82 | — | 1.81 | — | 1.82 | — |
| 1.77 | 1.77 | 1.79 | 1.78 | — | 1.77 |
| 1.76 | 1.76 | 1.76 | 1.76 | 1.76 | 1.76 |
| — | — | 1.75 | — | — | 1.75 |
| — | 1.74 | 1.74 | 1.73 | — | — |
| 1.71 | 1.72 | 1.72 | 1.71 | — | 1.70 |
| 1.67 | 1.67 | 1.67 | — | 1.67 | 1.67 |
| 1.66 | 1.66 | — | 1.66 | 1.66 | 1.66 |
| — | — | 1.65 | 1.65 | — | — |
| — | — | 1.64 | 1.64 | — | — |
| — | 1.63 | 1.63 | 1.63 | 1.63 | 1.62 |
| — | 1.61 | 1.61 | 1.61 | — | 1.61 |
| 1.58 | — | — | — | — | — |
| — | 1.57 | 1.57 | — | 1.57 | 1.57 |
| — | — | 1.56 | 1.56 | 1.56 | — |

Zeolite ZSM-5 can be suitably prepared by preparing a solution containing water, tetrapropyl ammonium hydroxide and the elements of sodium oxide, an oxide of aluminum or gallium and an oxide of silica, and having a composition, in terms of mole ratios of oxides, falling within the following ranges:

TABLE 3

| | Broad | Preferred | Particularly Preferred |
|---|---|---|---|
| OH$^-$/SiO$_2$ | 0.07–1.0 | 0.1–0.8 | 0.2–0.75 |
| R$_4$N$^+$/(R$_4$N$^+$+Na$^+$) | 0.2–0.95 | 0.3–0.9 | 0.4–0.9 |
| H$_2$O/OH$^-$ | 10–300 | 10–300 | 10–300 |
| YO$_2$/W$_2$O$_3$ | 5–100 | 10–60 | 10–40 | wherein R is propyl, W is aluminum and Y is silicon. This mixture is maintained at reaction conditions until the crystals of the zeolite are formed. Thereafter the crystals are separated from the liquid and recovered. Typical reaction conditions consist of a temperature of from about 75° to 175°C for a period of about six hours to 60 days. A more preferred temperature range is from about 90° to 150°C, with the amount of time at a temperature in such range being from about 12 hours to 20 days.

The digestion of the gel particles is carried out until crystals form. The solid product is separated from the reaction medium, as by cooling the whole to room temperature, filtering and water washing.

ZSM-5 is preferably formed as an aluminosilicate. The composition can be prepared utilizing materials which supply the elements of the appropriate oxide. Such compositions include, for an aluminosilicate, sodium aluminate, alumina, sodium silicate, solica hydrosol, silica gel, silicic acid, sodium hydroxide and tetrapropylammonium hydroxide. It will be understood that each oxide component utilized in the reaction mixture for preparing a member of the ZSM-5 family can be supplied by one or more initial reactants and they can be mixed together in any order. For example, sodium oxide can be supplied by an aqueous solution of sodium hydroxide, or by an aqueous solution of sodium silicate; tetrapropylammonium cation can be supplied by the bromide salt. The reaction mixture can be prepared either batchwise or continuously. Crystal size and crystallization time of the ZSM-5 composition will vary with the nature of the reaction mixture employed. ZSM-8 can also be identified, in terms of mole ratios of oxides, as follows:

$$0.9 \pm 0.2\ M_2/nO : Al_2O_3 : 5\text{-}100\ SiO_2 : z\ H_2O$$

wherein M is at least one cation, n is the valence thereof and z is from 0 to 40. In a preferred synthesized form, the zeolite has a formula, in terms of mole ratios of oxides, as follows:

$$0.9 \pm 0.2\ M_2/nO : Al_2O_3 : 10\text{-}60\ SiO_2 : z\ H_2O$$

and M is selected from the group consisting of a mixture of alkali metal cations, especially sodium, and tetraethylammonium cations.

ZSM-8 possesses a definite distinguishing crystalline structure having the following X-ray diffraction pattern:

TABLE 4

| dA° | I/I₀ | I/I₀ | dA° |
|---|---|---|---|
| 11.1 | 46 | 4 | 2.97 |
| 10.0 | 42 | 3 | 2.94 |
| 9.7 | 10 | 2 | 2.86 |
| 9.0 | 6 | 1 | 2.78 |
| 7.42 | 10 | 4 | 2.73 |
| 7.06 | 7 | 1 | 2.68 |
| 6.69 | 5 | 3 | 2.61 |
| 6.35 | 12 | 1 | 2.57 |
| 6.04 | 6 | 1 | 2.55 |
| 5.97 | 12 | 1 | 2.51 |
| 5.69 | 9 | 6 | 2.49 |
| 5.56 | 13 | 1 | 2.45 |
| 5.36 | 3 | 2 | 2.47 |
| 5.12 | 4 | 3 | 2.39 |
| 5.01 | 7 | 1 | 2.35 |
| 4.60 | 7 | 1 | 2.32 |
| 4.45 | 3 | 1 | 2.28 |
| 4.35 | 7 | 1 | 2.23 |
| 4.25 | 18 | 1 | 2.20 |
| 4.07 | 20 | 1 | 2.17 |
| 4.00 | 10 | 1 | 2.12 |
| 3.85 | 100 | 1 | 2.11 |
| 3.82 | 57 | 1 | 2.08 |
| 3.75 | 25 | 1 | 2.06 |
| 3.71 | 30 | 6 | 2.01 |
| 3.64 | 26 | 6 | 1.99 |
| 3.59 | 2 | 2 | 1.95 |
| 3.47 | 6 | 2 | 1.91 |
| 3.43 | 9 | 3 | 1.87 |
| 3.39 | 5 | 1 | 1.84 |
| 3.34 | 18 | 2 | 1.82 |
| 3.31 | 8 | | |
| 3.24 | 4 | | |
| 3.13 | 3 | | |
| 3.04 | 10 | | |
| 2.99 | 6 | | |

Zeolite ZSM-8 can be suitably prepared by reacting a water solution containing either tetraethylammonium hydroxide or tetraethylammonium bromide together with the elements of sodium oxide, aluminum oxide, and an oxide of silica.

The operable relative proportions of the various ingredients have not been fully determined and it is to be immediately understood that not any and all proportions of reactants will operate to produce the desired zeolite. In fact, completely different zeolites can be prepared utilizing the same starting materials depending upon their relative concentration and reaction conditions as is set forth in U. S. Pat. No. 3,308,069. In general, however, it has been found that when tetraethylammonium hydroxide is employed, ZSM-8 can be prepared from said hydroxide, sodium oxide, aluminum oxide, silica and water by reacting said materials in such proportions that the forming solution has a composition in terms of mole ratios of oxides falling within the following range $SiO_2/Al_2O_3$ — from about 10 to about 200

$Na_2O$/tetraethylammonium hydroxide — from about 0.05 to .020

Tetraethylammonium hydroxide/$SiO_2$ — from about 0.08 to 1.0

$H_2O$/tetraethylammonium hydroxide — from about 80 to about 200

Thereafter, the crystals are separated from the liquid and recovered. Typical reaction conditions consist of maintaining the foregoing reaction mixture at a temperature of from about 100°to 175°C for a period of time of from about 6 hours to 60 days. A more preferred temperature range is from about 150 to 175°C with the amount of time at a temperature in such range being from about 12 hours to 8 days.

The ZSM-5 type zeolites used in the instant invention usually have the original cations associated therewith replaced by a wide variety of other cations according to techniques well known in the art. Typical replacing cations would include hydrogen, ammonium and metal cations including mixtures of the same. Of the replacing cations, particular preference is given to cations of hydrogen, ammonium, rare earth, and mixtures thereof.

Typical ion exchange techniques would be to contact the particular zeolite with a salt of the desired replacing cation or cations. Although a wide variety of salts can be employed, particular preference is given to chlorides, nitrates and sulfates.

Representative ion exchange techniques are disclosed in a wide variety of patents including U. S. Pat. Nos. 3,140,249; 3,140,251; and 3,140,253.

Following contact with the salt solution of the desired replacing cation, the zeolites may be washed with water and dried at a temperature ranging from 150°F to about 600°F and thereafter heated in air or other suitable gas at temperatures ranging from about 500° to 1500°F for periods of time ranging from 1 to 48 hours or more.

It is also possible to treat the zeolite with steam at elevated temperatures ranging from 800° to 1,600°F and preferably 1,000° and 1,500°F, if such is desired. The treatment may be accomplished in atmospheres consisting partially or entirely of steam.

A similar treatment can be accomplished at lower temperatures and elevated pressures, e.g. 350°–700°F at 10 to about 200 atmospheres.

One embodiment of this invention resides in the use of a porous matrix together with the ZSM-5 type zeolite previously described. The ZSM-5 type zeolite can be combined, dispersed or otherwise intimately admixed with a porous matrix in such proportions that the resulting product contains from 1 to 95 percent by weight, and preferably from 20 to 80 percent by weight, of the zeolite in the final composite.

The term "porous matrix" includes inorganic compositions with which the aluminosilicates can be combined, dispersed or otherwise intimately admixed wherein the matrix may be active or inactive. It is to be understood that the porosity of the compositions employed as a matrix can either be inherent in the particular material or it can be introduced by mechanical or chemical means. Representative matrices which can be employed include metals and alloys thereof, sintered metals and sintered glass, asbestos, silicon carbide aggregates, pumice, firebrick, diatomaceous earths, and inorganic oxides. Inorganic compositions especially those of a siliceous nature are preferred. Of these matrices, inorganic oxides such as clay, chemically treated clay, silica, silica-alumina, etc., are particularly preferred because of their superior porosity, attrition resistance, and stability.

The compositing of the aluminosilicate with an inorganic oxide can be achieved by several methods wherein the aluminosilicates are reduced to a particle size less than 40 microns, preferably less than 10 microns, and intimately admixed with an inorganic oxide while the latter is in a hydrous state such as in the form of hydrosol, hydrogel, wet gelatinous precipitate, or in a dried state, or a mixture thereof. Thus, finely divided aluminosilicates can be mixed directly with a siliceous gel formed by hydrolyzing a basic solution of alkali metal silicate with an acid such as hydrochloric, sulfuric, acetic, etc. The mixing of the three components can be accomplished in any desired manner, such as in a ball mill or other types of mills. The aluminosilicates also may be dispersed in a hydrosol obtained by reacting an alkali metal silicate with an acid or alkaline coagulant. The hydrosol is then permitted to set in mass to a hydrogel which is thereafter dried and broken into pieces of desired shape or dried by conventional spray drying techniques or dispersed through a nozzle into a bath of oil or other water-immiscible suspending medium to obtain spheroidally shaped "bead" particles of catalyst such as described in U. S. Pat. No. 2,384,946. The aluminosilicate siliceous gel thus obtained is washed free of soluble salts and thereafter dried and/or calcined as desired.

In a like manner, the aluminosilicates may be incorporated with an aluminiferous oxide. Such gels and hydrous oxides are well known in the art and may be prepared, for example by adding ammonium hydroxide, ammonium carbonate, etc. to a salt of aluminum, such aluminum chloride, aluminum sulfate, aluminum nitrate, etc., in an amount sufficient to form aluminum hydroxide which, upon drying, is converted to alumina. The aluminosilicate may be incorporated with the aluminiferous oxide while the latter is in the form of hydrosol, hydrogel, or wet gelatinous precipitate or hydrous oxide, or in the dried state.

The catalytically active inorganic oxide matrix may also consist of a plural gel comprising a predominant amount of silica with one or more metals or oxides thereof selected from Groups, IB, II, III, IV, V, VI, VII, and VIII of the Periodic Table. Particular preference is given to plural gels or silica with metal oxides of Groups IIA, III and IVa of the Periodic Table, especially wherein the metal oxide is rare earth oxide, magnesia, alumina, zirconia, titania, beryllia, thoria, or combination thereof. The preparation of plural gels is well known and generally involves either separate precipitation or coprecipitation techniques, in which a suitable salt of the metal oxide is added to an alkali metal silicate and an acid or base, as required, is added to precipitate the corresponding oxide. The silica content of the siliceous gel matrix contemplated herein is generally within the range of 55 to 100 weight percent with the metal oxide content ranging from 0 to 45 percent.

The inorganic oxide may consist of raw clay or a clay mineral which has been treated with an acid medium to render it active. The aluminosilicate can be incorporated into the clay simply by blending the two and fashioning the mixture into desired shapes. Suitable clays include attapulgite, kaolin, sepiolite, polygarskite, kaolinite, halloysite, plastic ball clays, bentonite, montmorillonite, illite, chlorite, etc.

Other useful matrices include powders of refractory oxides, such as alumina, alpha alumina, etc., having very low internal pore volume. Preferably, these materials have substantially no inherent catalytic activity of their own.

The catalyst product can be heated in steam or in other atmospheres, e.g., air, near the temperature contemplated for conversion but may be heated to operating temperatures initially during use in the conversion process. Generally, the catalyst is dried between 150°F and 600°F and thereafter may be calcined in air, steam, nitrogen, helium, flue gas or other gases not harmful to the catalyst product at temperatures ranging from about 500° to 1600°F for periods of time ranging from 1 to 48 hours or more. It is to be understood that the aluminosilicate can also be calcined prior to incorporation into the inorganic oxide gel. It is also to be understood that the aluminosilicate or aluminosilicates need not be ion exchanged prior to incorporation in a matrix but can be so treated during or after incorporation into the matrix.

The novel process of this invention is carried out simply by contacting a feed stream consisting essentially of $C_2$–$C_4$ paraffins and/or olefins (ethane, propane, butane, ethylene, propylene, butene, isobutane, isobutene, and mixtures thereof) with a ZSM-5 type zeolite at a temperature from about 100°–700°C and recovering the aromatics produced. The reaction can take place at atmospheric pressure and in the absence of added hydrogen. The aromatics which are produced are predominantly $C_6$–$C_{10}$ aromatics.

It is to be immediately understood, however, that although the invention has been described with reference to the fact that it is not necessary to use a hydrogenation/dehydrogenation component nor is it necessary to carry out the reaction in the presence of added hydrogen, nevertheless, both these features can be employed if such is desired. It might very well be, for example, that the presence of hydrogenation component might have a beneficial effect on the catalyst in that it might be able to even further add to its stability by hydrogenating coke preformers as is well known in the art. As has been previously stressed, the prior art processes absolutely required hydrogen and required the presence of a strong hydrogenation component, whereas the novel process of this invention does not. However, the novel contribution disclosed herein should not be allowed to be circumvented by the mere addition of hydrogenation component to the ZSM-5 type catalysts and/or the matrix when such is used. In like manner the addition of hydrogen should not also be a means of circumventing the instant contribution. It is to be understood, however, that the preferred embodiment of this invention resides in operating in the absence of hydrogen and in the absence of a hydrogenation component.

When a hydrogenation/dehydrogenation component is used it need not be a "strong hydrogenation component" but can be any hydrogenation component conventionally known in the art. These components can include metals, oxides, and sulfides of metals of the Periodic Table which fall in Group VIB including chromium, molybdenum, tungsten and the like; Group IIB including zinc cadmium, Group VIIB including manganese and rhenium and Group VIII including cobalt, nickel, platinum, palladium, ruthenium, rhodium, and the like, and combinations of metals, sulfides and oxides of metals of Group VIB and VIII, such as nickeltungsten-sulfide, cobalt oxide-molybdenum oxide and the like.

Thus, the processing conditions envisioned in the operation of an instant process have temperatures ranging from 100° to 700°C, pressure ranging from 0 – 1,000 lbs psig, hydrogen to hydrocarbon ratios are from 0 – 20 and WHSV from 0.1 to 500. Preferred operating conditions are temperatures from 300° to 650°C atmospheric to 500 lbs/psig, absence of hydrogen and WHSV of from 0.5 to 400.

The following examples will now illustrate the best mode contemplated for carrying out this invention.

EXAMPLES 1–4

Examples 1–4 will illustrate the preparation of $C_6+$ aromatics by contacting propylene at various temperatures with a catalyst composition consisting of 80 parts by weight of H-ZSM-5 (prepared according to the procedures disclosed in copending application Ser. No. 865,470, filed Oct. 10, 1969) and 20 parts by weight of alumina. The catalyst composition contained no hydrogenation/dehydrogenation component and no added hydrogen was used. All runs were at atmospheric pressure.

Additional operating conditions and results are shown in the following table.

| Charge | Propylene | | | |
|---|---|---|---|---|
| WHSV | 3.9 | | | |
| Temperature (°C) | 200 | 300 | 400 | 500 |
| Product Recovery (Wt %) | | | | |
| Total Product (−196°) | 99 | 96 | 96 | 95 |
| Liquid Product (0°) | 59 | 61 | 52 | 55 |
| Product Yield (g/100 $C_3H_6$) | | | | |
| P+O+N | 44.0 | 35.5 | 12.5 | 2.8 |
| $C_6$ Aromatics | 2.9 | 1.1 | 2.0 | 10.4 |
| $C_7$ Aromatics | 3.5 | 6.3 | 23.3 | 35.9 |
| $C_8$ Aromatics | 3.8 | 6.0 | 9.2 | 4.0 |
| $C_8^+$ Aromatics | 5.1 | 12.5 | 4.5 | 2.1 |
| Liquid Product | 59 | 61 | 52 | 55 |
| $C_6^+$ Aromatics | 15 | 26 | 39 | 52 |
| $C_3$–$C_4$ Olefins | 31 | 4 | 8 | 17 |
| Aromatics and Olefins | 46 | 30 | 47 | 69 |

EXAMPLE 5

This example will illustrate that it is possible to use added weak hydrogenation/dehydrogenation components.

In this Example, the catalyst employed was an ammonium and zinc exchanged ZSM-8 (Zn/HZSM-8) (prepared in accordance with the procedure disclosed in Ser. No. 865,470, filed Oct. 10, 1969). The reaction took place at 500°C in the absence of added hydrogen and at a pressure of one atmosphere.

Results are shown in the following table:

| | |
|---|---|
| Propane (g) | 3.4 |
| Total Cond. Prod. (g) (−196°C) | 1.877 |
| Total Liquid Prod. (g) | 0.347 |
| GLC Analysis (Wt %) | |
| Paraffins and Olefins | 0.9 |
| $C_6$ — Aromatics | 48.6 |
| $C_7$ — Aromatics | 39.6 |
| $C_8$ — Aromatics | 7.1 |
| $C_8^+$ — Aromatics | 2.5 |
| Aromatics ($C_6$–$C_9$) (g) | 0.341 |
| Wt % of Charge | 10 |
| Heavy Gas Wt (g) | 1.53 |
| Analysis M. S. | |
| Olefins ($C_3$–$C_4$) (Wt %) | 12 |
| Paraffins (Wt %) | 87 |
| Olefins ($C_3$–$C_4$) (g) | 0.184 |
| Wt % of Charge | 5 |
| Olefins Plus Aromatics Wt % of Charge | 15 |

I claim:

1. A process for producing aromatic compounds which comprises contacting $C_2$–$C_4$ paraffins, olefins or mixtures thereof with a crystalline zeolite having a composition in terms of mole ratios of oxides as follows:

$$0.9 \pm 0.2\ M_2/nO : Al_2O_3 : Y\ SiO_2 : z\ H_2O$$

wherein M is at least one cation having a valence $n$, Y is at least 5 and $z$ is between 0 and 40, and having the X-ray diffraction lines as set forth in Table 1 of the specification at a temperature of 100° to 700° C., a pressure of 0 – 1,000 psig, a WHSV of 0.5 – 400, and a hydrogen to hydrocarbon ratio of 0 – 20 and recovering said aromatic compounds.

2. The process of claim 1 wherein the zeolitic material has a hydrogenation/dehydrogenation component associated therewith.

3. The process of claim 1 wherein the M represents ammonium or hydrogen cations.

4. The process of claim 1 wherein the temperature is from 300° – 650° C.

* * * * *

PO-1050
(5/69)

UNITED STATES PATENT OFFICE
CERTIFICATE OF CORRECTION

Patent No. 3,760,024          Dated September 18, 1973

Inventor(s) John Cattanach

It is certified that error appears in the above-identified patent and that said Letters Patent are hereby corrected as shown below:

| | |
|---|---|
| Column 3, line 57, | Delete "2.38" shown next to the column captioned "As Made". |
| Column 3, line 57, | Under column captioned "$CaCl_2$", insert --2.38--. |
| Column 4, line 30, | That portion of the formula reading "$(R_4N++$" should read --$(R_4N^++$ --. |

Signed and sealed this 2nd day of April 1974.

(SEAL)
Attest:

EDWARD M. FLETCHER, JR.
Attesting Officer

C. MARSHALL DANN
Commissioner of Patents